United States Patent Office 3,666,597
Patented May 30, 1972

3,666,597
METHOD OF CATALYZING ADHESIVE CURE
Willis E. Parnell, Oak Grove, Oreg., assignor of fractional part interest to Howard Carl Mason, Oregon City, Oreg.
No Drawing. Filed Aug. 29, 1967, Ser. No. 663,941
Int. Cl. C09j 5/04
U.S. Cl. 156—305                                    9 Claims

ABSTRACT OF THE DISCLOSURE

A procedure for bonding elements together, wherein the elements are assembled with a glue line between them, and the glue line comprises an adhesive and a catalyst for accelerating curing of the adhesive distributed in encapsulated form in the adhesive. Also distributed in the glue line is a somwhat less active nonencapsulated catalyst for the adhesive. After the elements have been assembled, the encapsulated catalyst is released by opening up the capsules to promote fast curing of the adhesive in localized regions distributed throughout the glue line, with final curing of the adhesive throughout the entire glue line being promoted also by the nonecapsulated catalyst.

---

This invention relates to the manufacture of consolidated products by the adhering of an assembly of elements together with an adhesive. A particular and preferred embodiment of the invention has to do with the manufacture of wood products from a consolidated assembly of boards, plys or other lamina.

The manufacture of wood laminates is an important part of the wood products industry. Ordinarily, a thermosetting resin is used in the adhesive forming the glue line, which is coated on the surface of at least one of the two lamina which are brought together to form a laminate, the adhesive subsequently curing to form a good bond. The adhesive before being spread as the glue line, for practical reasons, must be able to stand for a period of time before curing to such an extent as to impair its spreadability, bonding properties, etc. On the other hand, at some time after being distributed as a glue line, it is usually desirable to accelerate the cure of the adhesive to reduce the time of obtaining a finally cured consolidated product. With hot press adhsives, curing is promoted frequently by the application of heat and pressure. With cold press adhesives high frequency energy has been employed. In certain types of manufacture no attempt has been made to promote the curing, and a laminated article is simply clamped by some means until a sufficient amount of time has expired for the normal rate of cure to produce a permanent bond.

In general terms, this invention relates to a procedure for promoting the curing or setting of the adhesive in a glue line, after the glue line has been prepared as a deposit extending between multiple elements such as the wood lamina forming a glywood laminate.

The invention has particular utility in connection with cold pressing techniques, as it enables the elmination of high frequency generators and other such equipment for promoting curing, and reduces or eliminates the need for clamps or other devices for holding lamina together for an extended period of time while curing takes place. The invention also may be employed where hot press procedures are used, to permit reduction in the length of time heat and/or pressure need be applied.

A general object of the invention comprises the provision of a novel method for manufacturing a consolidated product from an assembly of elements, wherein a glue line is prepared between the elements of the assembly including a catalyst distributed in a dormant state, and such catalyst is released after forming of the assembly whereby it may then promote curing of the adhesive in the glue line. Using the invention, an adhesive may be utilized which is not subject to spoilage or appreciable polymerization while standing, and at the same time a fast rate of cure may be achieved after the assembly to be consolidated has been prepared.

Yet another object of the invention is to provide a method of assembling elements into a consolidated product, which features the use of a high potency catalyst distributed in a dormant state in the glue line during the preparation of the assembly, together with a less potent catalyst (which does not promote curing as fast as does the more potent catalyst) distributed in a nondormant or active state. On release of the catalyst embodiment in its dormant state, such produces regions of fast cure sufficient to hold the assembly together, with the other less potent catalyst then finishing the cure to produce a complete bond.

A further object is to provide a method of the type indicated, wherein the catalyst is reduced to a dormant state by encapsulation, and capsules of the catalyst are distributed in the glue line of the assembly, and it is afer preparation of the assembly that the encapsulated catalyst is released.

In a specific embodiment of the invention, release of the catalyst is brought about by applying outside pressure to the elements forming the assembly, which pressure is transmitted through these elements to the encapsulated catalyst to break the capsules.

Another object of the invention is to provide a procedure for manufacturing a consolidated product from an assembly of elements, where release of a dormant catalyst is produced by the dissolving of an encapsulated catalyst, such release, therefore, being dependent upon the lapse of time after assembly, and the inclusion of a solvent in the adhesive spread which acts to dissolve the material encapsulating the catalyst.

Other various objects and advantages of the invention will become more fully apparent as the following description is read in conjunction with certain specific examples, included for purposes of illustration only.

As already generally indicated, the invention is particularly applicable to the manufacture of laminates from wood, particularly where such laminates are prepared using cold press techniques. Such a situation presents itself, for instance, in a manufacturing operation which is not provided with hot press equipment. Further, in the manufacture of certain products such as furniture components and other items, wherein very thin veneers, are employed, the types of adhesives used or the procedures required for the manufacture may make hot pressing impractical.

The use of high frequency energy for curing the glue lines has several disadvantages. For one thing, the equipment utilized is expensive and requires skill in maintenance and a considerable amount of power to run. Even with a considerable amount of energy employed, long cycles in a press sometimes are needed, producing bottlenecks in the production process. The adhesives that are used with high frequency gluing require close control in their mixing, if reliable results are to be obtained. To minimize the time required during which high frequency energy is used, relatively reactive catalysts have been employed, tending to reduce the pot life of the adhesive and to limit the layup time permitted to consolidate the assemblies to be bonded. Particularly important, because of the control needed over the type of catalyst used, and the critical effects of time, product reliability is affected, with the result that unexplainable delamination occurs in products produced. Such often is not discoverable until a period of time after product manufacture, rendering all of the products made during such time suspect.

As contemplated by this invention an adhesive is prepared for bonding laminates which may be made of the usual formaldehyde condensates, such as phenol or urea formaldehyde condensate resins. There may also be included in the adhesive a mild catalyst distributed in an active state throughout the adhesive, and operable to produce over a period of time ranging from a half of a day to a day curing of a glue line prepared from the adhesive under cold temperature conditions. This catalyst, being relatively mild, does not detrimentally affect the pot life of the adhesive, nor does it constitute a significant factor in limiting layup time assemblies. Further incorporated with the adhesive is a relatively high potency catalyst, such as undeliquiesed acid, or other dry form acid crystal, encapsulated in a capsule which is operable to place the catalyst in a dormant state when distributed in the adhesive solution.

The capsules of catalyst are relatively small in size, so that when distributed in a glue line between adjacent elements in an assembly to be consolidated, they do not thicken the glue line or introduce other difficulties. It is contemplated in one modification of the invention that the encapsulated catalyst may be incorporated with the liquid adhesive mix, and then be distributed in the glue line between adjacent elements in an assembly through the act of spreading the adhesive mix, and in this type of procedure having a small size for the encapsulated catalyst is important if the capsules of catalyst are to be spreadable with the adhesive without interfering with the spreading process. As another alternative, it is possible for the encapsulated catalyst to be distributed in the glue line by spreading the adhesive in one step, and then sprinkling the capsules on the spread adhesive in a well-dispersed manner. In this instance also, if the capsules are of small size, distributing of the catalyst in a uniform manner is promoted. Thus, and considering a specific and preferred condition, capsules for the catalyst ranging from one-quarter to one-half millimeter in diameter are contemplated.

The invention contemplates opening up of the capsules which encapsulate the catalyst at a time after the glue line is prepared between the sheets or elements in the assembly to be consolidated. This opening up of the capsule may be produced in several different ways, each having its own particular advantages. For instance, it is contemplated that the material encapsulating the catalyst may be a thin wall of cellulose, which is easily fractured on the capsule being compressed. On the capsule opening, the catalyst becomes active in the region where the capsule is located. Such breaking of a capsule may be produced by subjecting an assembly of elements or sheets to be consolidated to external pressure, with such pressure being transmitted through the elements to a capsule located at the glue line. With this procedure, the time at which the high potency catalyst is exposed to the ingredients of the glue line is controllable, and determined by the time at which external pressure is applied. As an alternative procedure, the material making up the capsules may comprise a material which is soluble in the ingredients of the adhesive. Thus, a thin film of gelatine may be utilized as the encapsulating medium, which gelatine film on standing in the glue line after a period of time dissolves in the water which ordinarily forms a part of the glue line spread.

On exposure of the high potency catalyst to the ingredients of the glue line, as already mentioned, curing of the glue line in localized regions results, which may take place relatively rapidly, for example, over a period of five to ten minutes. Interspersed with these regions of fast curing adhesive are regions of adhesive catalyzed only by the mild catalyst which promotes curing over a longer period of time. With the process of the invention, pressure may be applied to the assemblage of elements or sheets only for such interval as is required to obtain curing in the localized regions catalyzed by the high potency catalyst. Pressure may then be relaxed, and the assemblage of sheets or elements will then be held together, by the cured regions in the adhesive, for the time needed for the remainder of the glue line to cure completely. Thus, with the invention, use of a press or clamps need not be for the entire 12 to 24-hour period required for complete curing to be produced by the mild catalyst, but only for such time as is required for a cure to be reached in those regions where cure is promoted by the high potency catalyst.

Describing a particular embodiment of the invention, a urea-formaldehyde condensate resin adhesive may be prepared from an aqueous solution of urea-formaldehyde resin containing about 60% solids. Distributed within this resin solution is the usual mild type of catalyst employed in conventional gluing processes, comprising (based on 100 parts of resin solution) about five parts of a buffered sodium hydroxide solution. The sodium hydroxide solution may be a 50% aqueous solution, containing two parts sodium hydroxide for each five parts of calcium chloride buffering medium in the solution.

In addition to the catalyst above-described, which is distributed in the adhesive in an active, nonencapsulated state, capsules containing particles of crystalline phosphoric acid may also be distributed in the adhesive. Capsules of cellulose, with the thickness of the capsule walls being in the range of from two to three microns, contain the phosphoric acid crystals. The capsules have a size ranging from about one-half to one-fourth millimeter in diameter. About three parts of such encapsulated catalyst may be incorporated in the adhesive for every 100 parts of resin solution.

A laminated product may be prepared from wood veneers, assembled by stacking the veneers with the grain of successive veneers extending across each other. A glue line may be prepared between the veneers by spreading the adhesive above described at the rate of about 35–40 lbs. per 1,000 square feet of glue line, over a veneer face prior to placing another veneer over it. With an assembly of stacked veneers prepared, the same may be placed in a press and subjected to a press pressure ranging from about 100–400 lbs. per square inch (300 lbs. per inch being typical). Such pressure causes the capsules surrounding the acid crystals to rupture, whereby the capsules in glue line between veneers rupture. After a period of about ten minutes, the liberated acid crystals produce cured regions in the glue lines effective to hold the veneers in the stack together.

The assembly of stacked veneers may then be stored without the application of internal pressure of heat for a period of about a day. During such time the mild alkali catalyst distributed in the resin is effective to complete curing of the adhesive in the glue lines. in regions surrounding those cured by the acid catalyst.

Explaining another example of the invention, a glue line between veneers may be prepared using an adhesive similar to the one set forth above, save that capsules of phosphoric acid encapsulated in gelatine (or a water-soluble material) may be substituted for the cellulose capsules first described. Further, the glue line between adjacent veneers is produced in two steps, comprising first spreading the adhesive without encapsulated catalyst on the face of a veneer, and then sprinkling the encapsulated catalyst onto the spread adhesive prior to the superpositioning of another veneer over the veneer face spread with adhesive. After producing a stack of veneers, with a glue line between adjacent veneers, the stack may be placed in a press and subjected to a pressure ranging from 300–400 lbs. per square inch. The capsules encasing the catalyst dissolve to expose the phosphoric acid with the stacked veneers in the press, and shortly after the dissolving, the exposed acid catalyst produces cured regions in the glue lines effective to hold the veneers in the stack together. The assembled veneer stack may then be removed and stored for a day, while final curing of the adhesive in the glue line takes place.

It will be apparent from the above that the method of this invention permits the storage of an adhesive without the risk of such adhesive prematurely polymerizing so as to become unworkable. Using the invention, less criticality is involved in incorporating the catalyst with the adhesive, and in the assembly times when the adhesive is spread out in glue lines. The high potency catalyst according to one modification of the invention is released by pressure at a time which is controllable after an assembly has been formed. In another modification of the invention, the catalyst is released by the lapse of a time interval, with such time interval being measured from the time that the encapsulated catalyst is added to the adhesive, which may be directly before the final assembly of the sheets or elements. In both instances, and with release of the high potency catalyst, curing of the regions in the glue line takes place relatively rapidly, whereby an assembly need be held under pressure only for a short period of time. Thus, with the procedures contemplated, extensive press or clamping facilities are not required and the need for high frequency curing apparatus to speed curing is eliminated.

While several modifications or embodiments of the invention have been described, obviously changes and variations are possible without departing from the invention. It is desired to cover all such modifications and variations as would be apparent to one skilled in the art, and that come within the scope of the appended claims.

It is claimed and desired to secure by Letters Patent:

1. In the manufacture of a consolidated product which is an assembly of elements bonded together by a cured glue line, the method comprising assembling the elements in the position that they have in the consolidated product, during such assembly preparing a wet glue line between the elements using an adhesive of slow enough curing time to permit the assembling of the elements, said wet glue line comprising a layer of adhesive having a catalyst for promoting curing distributed in a dormant state throughout, and after assembly of the elements and with the wet glue line prepared releasing the catalyst from its dormant state thus to accelerate curing of the adhesive in the glue line.

2. The method of claim 1, wherein the catalyst is distributed in multiple, localized concentrations in the adhesive forming the wet glue line, and on release of the catalyst from its dormant state localized regions of accelerated curing time are produced.

3. The method of claim 2, wherein the adhesive in the wet glue line is prepared with additional catalyst in a non-dormant state distributed in the glue line together with the catalyst which is in a dormant state.

4. The method of claim 1, wherein the catalyst which is distributed in the wet glue line in a dormant state is encapsulated thus to produce dormancy, and after assembly of the elements capsules encapsulating the catalyst are opened to release the catalyst.

5. The method of claim 4, wherein opening of the capsules is produced by dissolving the capsules with a solvent forming part of the wet glue line.

6. The method of claim 4, wherein the assembly of elements is compressed after its preparation, and the compression of the assembly opens the capsules by breaking them.

7. The method of claim 1, wherein the wet glue line is prepared by spreading liquid adhesive over at least one element, the catalyst is distributed in the wet glue line while encapsulated in capsules, and the assembly of elements is produced by placing another element against the first-mentioned element with the glue line comprising adhesive and encapsulated catalyst between the elements.

8. The method of claim 7, wherein the encapsulated catalyst is released within the wet glue line by opening up the capsules containing the catalyst after the assembly of elements has been prepared.

9. The method of claim 7, wherein the wet glue line is prepared by spreading liquid adhesive over at least one element, catalyst is distributed in the wet glue line both as capsules of catalyst and also as nonencapsulated ingredient, and the nonencapsulated catalyst is a slower promoter of curing than the catalyst which is distributed within capsules.

References Cited
UNITED STATES PATENTS

| 2,015,806 | 10/1935 | Menger | 156—319 X |
| 2,690,879 | 10/1954 | Snyder | 156—92 X |
| 3,282,533 | 11/1966 | Spain | 244—1 |

OTHER REFERENCES

Product Engineering, vol. 38, No. 2, p. 31, Jan. 16, 1967.

LELAND A. SEBASTIAN, Primary Examiner

U.S. Cl. X.R.

156—155, 319, 324, 331; 161—Dig. 1